US010297119B1

(12) United States Patent
Wiederhold et al.

(10) Patent No.: US 10,297,119 B1
(45) Date of Patent: May 21, 2019

(54) FEEDBACK DEVICE IN AN ELECTRONIC DEVICE

(71) Applicant: APPLE INC., Cupertino, CA (US)

(72) Inventors: Curtis P. Wiederhold, Cupertino, CA (US); Benjamin A. Bard, Cupertino, CA (US); Justin D. Crosby, Cupertino, CA (US); Hugo D. Verweij, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/567,017

(22) Filed: Dec. 11, 2014

Related U.S. Application Data

(60) Provisional application No. 62/044,946, filed on Sep. 2, 2014.

(51) Int. Cl.
*H04B 3/36* (2006.01)
*G08B 6/00* (2006.01)
*G08B 3/10* (2006.01)

(52) U.S. Cl.
CPC ................ *G08B 6/00* (2013.01); *G08B 3/10* (2013.01)

(58) Field of Classification Search
CPC ...... G06F 3/016; G06F 3/041; G06F 3/03547; G06F 3/01; G08B 6/00; G08B 3/10
USPC ........................................................ 340/407.1
See application file for complete search history.

(56) References Cited

U.S. PATENT DOCUMENTS

| | | | |
|---|---|---|---|
| 3,176,241 A | 3/1965 | Hogan | |
| 4,423,640 A | 1/1984 | Jetter | |
| 4,558,757 A | 12/1985 | Mori | |
| 4,577,174 A | 3/1986 | Lemmer | |
| 4,716,393 A | 12/1987 | Logie | |
| 4,897,582 A | 1/1990 | Otten et al. | |
| 5,052,844 A | 10/1991 | Kendall | |
| 5,103,404 A | 4/1992 | McIntosh | |
| 5,231,336 A * | 7/1993 | van Namen | F16F 7/1011 310/12.01 |
| 5,541,372 A | 7/1996 | Bailer et al. | |
| 5,734,373 A | 3/1998 | Rosenberg | |
| 5,805,138 A | 9/1998 | Brawne | |

(Continued)

FOREIGN PATENT DOCUMENTS

| | | |
|---|---|---|
| CN | 1659583 | 8/2005 |
| CN | 01477422 A | 7/2009 |

(Continued)

OTHER PUBLICATIONS

U.S. Appl. No. 13/766,736, filed Feb. 13, 2013, Wright et al.

(Continued)

*Primary Examiner* — Naomi J Small
(74) *Attorney, Agent, or Firm* — Brownstein Hyatt Farber Schreck, LLP

(57) ABSTRACT

An electronic device can include one or more actuators. The actuator or actuators may be operably connected to a feedback surface. Movement is produced in at least one actuator that causes an audio output. The movement in the actuator(s) by itself may produce the desired audio output. The movement in the actuator(s) can produce a force in at least one direction that produces movement in the feedback surface, and the movement in the feedback surface produces audio output. The movement in the actuator may also provide a haptic output to a user.

20 Claims, 10 Drawing Sheets

(56) References Cited

U.S. PATENT DOCUMENTS 5,999,168 A 12/1999 Rosenberg et al.
6,100,874 A 8/2000 Schena et al.
6,219,038 B1 4/2001 Cho
6,337,678 B1 1/2002 Fish
6,373,465 B2 4/2002 Jolly
6,388,655 B1 5/2002 Leung
6,492,979 B1 12/2002 Kent
6,518,954 B1 2/2003 Chen
6,747,631 B1 6/2004 Sakamaki
6,816,049 B2 11/2004 Watanabe
6,937,124 B1 8/2005 Nakamura
6,940,494 B2 9/2005 Hoshino et al.
7,031,592 B2 4/2006 Akieda
7,044,681 B2 5/2006 Quenzi et al.
7,091,886 B2 8/2006 DePue
7,152,482 B2 12/2006 Ueno
7,176,897 B2 2/2007 Roberts
7,219,549 B2 5/2007 Honkura et al.
7,245,293 B2 7/2007 Hoshino et al.
7,283,120 B2 10/2007 Grant
7,290,694 B2 11/2007 Kirby et al.
7,331,245 B2 2/2008 Nishimura
7,436,396 B2 10/2008 Akieda
7,443,384 B2 10/2008 Harada
7,511,706 B2 3/2009 Schena
7,525,532 B2 4/2009 Liu et al.
7,532,202 B2 5/2009 Roberts
7,557,051 B2 7/2009 Ryu
7,567,232 B2 7/2009 Rosenberg
7,639,232 B2 12/2009 Grant et al.
7,656,388 B2 2/2010 Schena et al.
7,656,393 B2 2/2010 King
7,685,538 B2 3/2010 Fleck et al.
7,692,078 B2 4/2010 Hayashi
7,710,397 B2 5/2010 Krah et al.
7,791,506 B2 9/2010 Riihimaki
7,791,588 B2 9/2010 Tierling et al.
7,825,903 B2 11/2010 Anastas et al.
7,877,707 B2 1/2011 Westerman
7,920,225 B2 4/2011 Nishikawa et al.
7,924,145 B2 4/2011 Yuk
7,948,337 B2 5/2011 Chu
7,952,566 B2 5/2011 Poupyrev
8,013,961 B2 9/2011 Adachi et al.
8,059,104 B2 11/2011 Shahoian
8,059,105 B2 11/2011 Rosenberg
8,081,156 B2 12/2011 Ruettiger
8,084,968 B2 12/2011 Murray et al.
8,117,912 B2 2/2012 Kawakubo
8,132,468 B2 3/2012 Radivojevic
8,139,038 B2 3/2012 Chueh
8,144,129 B2 3/2012 Hotelling
8,169,332 B2 5/2012 Son
8,169,401 B2 5/2012 Hardwick
8,169,402 B2 5/2012 Shahoian et al.
8,232,969 B2 7/2012 Grant
8,252,695 B2 8/2012 Tan
8,259,066 B2 9/2012 Cheng et al.
8,260,337 B2 9/2012 Periyalwar et al.
8,264,465 B2 9/2012 Grant et al.
8,279,175 B2 10/2012 Kim et al.
8,287,522 B2 10/2012 Moses et al.
8,291,776 B1 10/2012 Pickens
8,296,670 B2 10/2012 Matthews et al.
8,310,350 B2 11/2012 Pfau et al.
8,310,444 B2 11/2012 Peterson et al.
8,310,452 B2 11/2012 Takenaka et al.
8,315,834 B2 11/2012 Gimelfarb et al.
8,319,727 B2 11/2012 Norieda
8,373,664 B2 2/2013 Wright
8,378,798 B2 2/2013 Bells et al.
8,378,965 B2 2/2013 Gregorio et al.
8,400,410 B2 3/2013 Taylor
8,421,567 B2 4/2013 Eckl et al.
8,466,889 B2 6/2013 Tong et al.
8,482,381 B2 7/2013 Chatterjee et al.
8,487,759 B2 7/2013 Hill
8,488,308 B2 7/2013 LeVasseur
8,502,547 B2 8/2013 Philipp
8,525,778 B2 9/2013 Colgate et al.
8,536,978 B2 9/2013 Coggill
8,570,162 B2 10/2013 Ujii
8,570,297 B2 10/2013 Bulea
8,581,901 B2 11/2013 Joshi
8,587,542 B2 11/2013 Moore
8,593,409 B1 11/2013 Heubel
8,610,684 B2 12/2013 Kalu et al.
8,633,901 B2 1/2014 Orr et al.
8,633,911 B2 1/2014 Schediwy et al.
8,633,916 B2 1/2014 Bernstein et al.
8,648,816 B2 2/2014 Homma et al.
8,671,782 B2 3/2014 Mink
8,686,839 B2 4/2014 Posamentier
8,686,961 B2 4/2014 Yamano
8,717,152 B2 5/2014 Bhatia et al.
8,730,199 B2 5/2014 Sleeman et al.
8,760,669 B2 6/2014 Heath et al.
8,783,106 B1 7/2014 Nielson
8,799,827 B2 8/2014 Hinckley et al.
8,810,522 B2 8/2014 Tse
8,836,648 B2 9/2014 Wilairat
8,854,317 B2 10/2014 Homma et al.
8,884,892 B2 11/2014 Bakker
8,892,051 B2 11/2014 Yi et al.
8,898,564 B2 11/2014 Grant
8,901,783 B2 12/2014 Gregory et al.
8,907,661 B2 12/2014 Maier
8,915,422 B1 12/2014 Harty
8,976,537 B2 3/2015 Ito
9,013,405 B2 4/2015 Kujawski et al.
9,013,430 B2 4/2015 McCann
9,030,306 B2 5/2015 Lim et al.
9,030,419 B1 5/2015 Freed
9,054,627 B2 6/2015 Bosch et al.
9,086,740 B2 7/2015 Furukawa
9,110,532 B2 8/2015 Ando et al.
9,111,424 B2 8/2015 Lim et al.
9,120,009 B2 9/2015 Bae et al.
9,122,345 B2 9/2015 Chen
9,148,190 B1 * 9/2015 Buuck ...................... H04B 1/38
9,158,407 B2 10/2015 Coulson et al.
9,164,605 B1 10/2015 Pirogov
9,182,859 B2 11/2015 Coulson et al.
9,207,801 B2 12/2015 Schediwy et al.
9,223,471 B2 12/2015 Buxton
9,262,002 B2 2/2016 Momeyer et al.
9,274,682 B2 3/2016 Hinckley et al.
9,282,893 B2 3/2016 Longinotti-Buitoni et al.
9,298,260 B2 3/2016 Karaoguz
9,304,587 B2 4/2016 Wright et al.
9,348,473 B2 5/2016 Ando
9,349,552 B2 5/2016 Huska
9,360,968 B2 6/2016 Wright
9,372,543 B2 6/2016 Behles
9,389,686 B2 7/2016 Zoller
9,449,476 B2 9/2016 Lynn et al.
9,454,256 B2 9/2016 Fisher et al.
9,798,409 B1 10/2017 Wells et al.
2004/0080494 A1 4/2004 Fahlman
2007/0152966 A1 7/2007 Krah et al.
2008/0018611 A1 1/2008 Serban et al.
2008/0068343 A1 3/2008 Hoshino et al.
2008/0084384 A1 4/2008 Gregorio et al.
2008/0111791 A1 5/2008 Nikittin
2008/0165159 A1 7/2008 Soss et al.
2008/0191648 A1 8/2008 Ito et al.
2008/0297478 A1 12/2008 Hotelling et al.
2009/0002199 A1 1/2009 Lainonen et al.
2009/0027038 A1 1/2009 Garmire et al.
2009/0102805 A1 4/2009 Meijer et al.
2009/0115734 A1 5/2009 Fredriksson
2009/0167704 A1 7/2009 Terlizzi et al.
2009/0174672 A1 7/2009 Schmidt
2009/0225046 A1 9/2009 Kim

(56) References Cited

U.S. PATENT DOCUMENTS

| | | | | |
|---|---|---|---|---|
| 2009/0242282 | A1 | 10/2009 | Kim | |
| 2009/0316380 | A1 | 12/2009 | Armstrong | |
| 2009/0322183 | A1 | 12/2009 | Kawakubo | |
| 2010/0053116 | A1 | 3/2010 | Daverman et al. | |
| 2010/0107067 | A1 | 4/2010 | Vaisanen | |
| 2010/0141408 | A1 | 6/2010 | Doy et al. | |
| 2010/0149111 | A1 | 6/2010 | Olien | |
| 2010/0149124 | A1 | 6/2010 | Kim | |
| 2010/0164959 | A1 | 7/2010 | Brown et al. | |
| 2010/0182263 | A1 | 7/2010 | Aunio et al. | |
| 2010/0214239 | A1 | 8/2010 | Wu | |
| 2010/0225600 | A1 | 9/2010 | Dai et al. | |
| 2010/0245254 | A1 | 9/2010 | Olien et al. | |
| 2010/0328229 | A1 | 12/2010 | Weber | |
| 2011/0141052 | A1* | 6/2011 | Bernstein | G06F 3/016 345/174 |
| 2011/0141053 | A1 | 6/2011 | Bulea et al. | |
| 2011/0163985 | A1 | 7/2011 | Bae et al. | |
| 2011/0227872 | A1 | 9/2011 | Huska | |
| 2011/0248916 | A1 | 10/2011 | Griffin | |
| 2012/0013531 | A1 | 1/2012 | Wilson | |
| 2012/0038568 | A1 | 2/2012 | Colloms et al. | |
| 2012/0038577 | A1 | 2/2012 | Brown et al. | |
| 2012/0050230 | A1 | 3/2012 | Harris | |
| 2012/0062491 | A1 | 3/2012 | Coni et al. | |
| 2012/0133496 | A1 | 5/2012 | Aono | |
| 2012/0154315 | A1 | 5/2012 | Aono | |
| 2012/0139860 | A1 | 6/2012 | Hotelling et al. | |
| 2012/0182238 | A1 | 7/2012 | Lee | |
| 2012/0200520 | A1* | 8/2012 | Harris | G06F 3/016 345/173 |
| 2012/0206147 | A1* | 8/2012 | Sim | G01K 7/34 324/457 |
| 2012/0206246 | A1 | 8/2012 | Cruz-Hernandez et al. | |
| 2012/0206247 | A1* | 8/2012 | Bhatia | G06F 3/016 340/407.1 |
| 2012/0229264 | A1 | 9/2012 | Bosch et al. | |
| 2012/0235942 | A1 | 9/2012 | Shahoian et al. | |
| 2012/0249462 | A1 | 10/2012 | Flanagan et al. | |
| 2012/0286847 | A1* | 11/2012 | Peshkin | G06F 3/016 327/517 |
| 2012/0319987 | A1 | 12/2012 | Woo | |
| 2012/0320085 | A1 | 12/2012 | Mei et al. | |
| 2012/0326981 | A1 | 12/2012 | Kurose | |
| 2012/0326989 | A1* | 12/2012 | Verthein | G06F 3/016 345/173 |
| 2013/0076652 | A1 | 3/2013 | Leung | |
| 2013/0154933 | A1 | 6/2013 | Sheik-Nainar | |
| 2013/0179827 | A1 | 7/2013 | Eriksson et al. | |
| 2013/0198625 | A1 | 8/2013 | Anderson et al. | |
| 2013/0222267 | A1 | 8/2013 | Almalki | |
| 2013/0222289 | A1 | 8/2013 | Kwak | |
| 2013/0321290 | A1 | 12/2013 | Oh | |
| 2014/0028575 | A1 | 1/2014 | Parivar et al. | |
| 2014/0145836 | A1 | 5/2014 | Tossavanen et al. | |
| 2014/0176415 | A1* | 6/2014 | Buuck | G06F 3/016 345/156 |
| 2014/0176485 | A1 | 6/2014 | Holmberg et al. | |
| 2014/0191973 | A1* | 7/2014 | Zellers | G06F 3/0414 345/168 |
| 2014/0197936 | A1 | 7/2014 | Biggs et al. | |
| 2014/0198071 | A1 | 7/2014 | Algreatly | |
| 2014/0319232 | A1* | 10/2014 | Gourlay | G05D 23/1905 236/51 |
| 2014/0341420 | A1* | 11/2014 | Karkkainen | H04R 1/2842 381/387 |
| 2014/0347289 | A1* | 11/2014 | Suh | G06F 3/017 345/173 |
| 2015/0089435 | A1 | 3/2015 | Kuzmin | |
| 2015/0109223 | A1 | 4/2015 | Kessler et al. | |
| 2015/0116205 | A1 | 4/2015 | Westerman et al. | |
| 2015/0130730 | A1 | 5/2015 | Harley et al. | |
| 2015/0155474 | A1 | 6/2015 | Tanimoto et al. | |
| 2015/0177899 | A1 | 6/2015 | Degner et al. | |
| 2015/0192482 | A1 | 7/2015 | Araki | |
| 2015/0227280 | A1 | 8/2015 | Westerman et al. | |
| 2015/0234493 | A1 | 8/2015 | Parivar et al. | |
| 2015/0242037 | A1 | 8/2015 | Pedder et al. | |
| 2015/0301642 | A1 | 10/2015 | Hanaur et al. | |
| 2015/0346881 | A1 | 12/2015 | Watazu | |
| 2016/0085355 | A1 | 3/2016 | Pirogov et al. | |
| 2016/0091972 | A1 | 3/2016 | Patel et al. | |
| 2016/0162030 | A1 | 6/2016 | Patel et al. | |
| 2016/0162031 | A1 | 6/2016 | Westerman et al. | |
| 2016/0188010 | A1 | 6/2016 | Wright et al. | |
| 2017/0268942 | A1 | 9/2017 | Pedder et al. | |
| 2018/0120940 | A1 | 5/2018 | Kessler et al. | |

FOREIGN PATENT DOCUMENTS

| | | |
|---|---|---|
| CN | 101482785 | 7/2009 |
| CN | 101523329 | 9/2009 |
| CN | 01763193 A | 6/2010 |
| CN | 101833393 | 9/2010 |
| CN | 101868770 | 10/2010 |
| CN | 102047088 | 5/2011 |
| CN | 102084325 | 6/2011 |
| CN | 102084328 | 6/2011 |
| CN | 102144205 | 8/2011 |
| CN | 102339166 | 2/2012 |
| CN | 102426490 | 4/2012 |
| CN | 102640093 | 8/2012 |
| CN | 1496549 | 10/2012 |
| CN | 102713805 | 10/2012 |
| CN | 102870080 | 1/2013 |
| CN | 103097990 | 5/2013 |
| DE | 102010007486 | 8/2011 |
| EP | 2077490 | 7/2009 |
| EP | 2202619 | 6/2010 |
| EP | 2320309 | 5/2011 |
| EP | 2357547 | 8/2011 |
| EP | 2375306 | 10/2011 |
| EP | 2381340 | 10/2011 |
| EP | 2395414 | 12/2011 |
| EP | 2648071 | 10/2013 |
| JP | 2007034991 | 2/2007 |
| KR | 101274123 | 6/2013 |
| KR | 20130109288 | 10/2013 |
| TW | 201314541 | 4/2013 |
| WO | WO2012/161061 | 11/2012 |
| WO | WO 13/169299 | 11/2013 |
| WO | WO 13/169303 | 11/2013 |
| WO | WO 13/169305 | 11/2013 |
| WO | WO 13/188307 | 12/2013 |
| WO | WO 14/017407 | 1/2014 |
| WO | WO 14/018111 | 1/2014 |
| WO | WO 15/020663 | 2/2015 |

OTHER PUBLICATIONS

U.S. Appl. No. 13/559,577, filed Jul. 26, 2012, Parivar et al.
U.S. Appl. No. 14/399,606, filed Nov. 7, 2014, Parivar et al.
U.S. Appl. No. 14/624,296, filed Feb. 17, 2015, Westerman et al.
U.S. Appl. No. 14/399,634, filed Nov. 7, 2014, Westerman et al.
U.S. Appl. No. 14/399,671, filed Nov. 7, 2014, Harley et al.
U.S. Appl. No. 14/404,156, filed Nov. 26, 2014, Degner et al.
U.S. Appl. No. 14/417,537, filed Jan. 26, 2015, Augenbergs et al.
U.S. Appl. No. 14/550,845, filed Nov. 21, 2014, Pedder et al.
U.S. Appl. No. 14/567,017, filed Dec. 11, 2014, Bard et al.
U.S. Appl. No. 14/637,563, filed Mar. 4, 2015, Wells et al.
U.S. Appl. No. 14/792,267, filed Jul. 6, 2015, Patel et al.
U.S. Appl. No. 15/045,628, filed Feb. 17, 2016, Patel et al.
U.S. Appl. No. 15/046,418, filed Feb. 17, 2016, Westerman et al.
Product Specification Sheet: GEEPLUS, VIBRO1 Vibration Actuator, 2 pages, www.geeplus.biz, downloaded on Jul. 15, 2015.
"Immersion Announces MOTIV™ Development Platform for Android," retrieved from the Internet: URL:http://ir.immersion.com/releasedetail.cfm?sh_email=no&releaseid=549080, Feb. 10, 2011.
Pava et al., "Real Time Platform Middleware for Transparent Prototyping of Haptic Applications," 2004.

(56) References Cited

OTHER PUBLICATIONS

Technifast, "Blind Captive Nuts," Jun. 30, 2013, http://www.technifast.co.uk.
Zordan, Enrico et al., "Principle design and actuation of a dual chamber electromagnetic micropump with coaxial cantilever valves," Biomedical Microdevices, Kluwer Academic Publishers, BO, vol. 12, No. 1, Oct. 17, 2009, pp. 55-62.
International Search Report and Written Opinion, dated Feb. 12, 2014, PCT/US2013/052006, 15 pages.
International Search Report and Written Opinion, dated Apr. 24, 2014, PCT/US2014/013206, 12 pages.
U.S. Appl. No. 15/612,922, filed Jun. 2, 2017, Pedder et al.
U.S. Appl. No. 15/791,618, filed Oct. 24, 2017, Wells et al.
U.S. Appl. No. 15/797,992, filed Oct. 30, 2017, Kessler et al.

* cited by examiner

FEEDBACK DEVICE IN AN ELECTRONIC DEVICE

CROSS-REFERENCE TO RELATED APPLICATION

This application claims the benefit under 35 U.S.C. § 119(e) of U.S. Provisional Patent Application No. 62/044,946, filed Sep. 2, 2014, entitled "Feedback Device in an Electronic Device," the entirety of which is incorporated herein by reference.

TECHNICAL FIELD

The present invention relates generally to electronic devices, and more particularly to a feedback device that includes one or more actuators that produce an audio output.

BACKGROUND

Consumer electronic devices, such as laptop computers and smart telephones, may employ different types of devices to provide feedback to a user. In particular, a haptic device can be used to provide haptic feedback to a user by producing vibrations in a surface that are felt by the user. Additionally, a separate sound emitting device, such as a speaker, may provide sound that is heard by the user. However, the operation of a haptic device and a speaker can produce side effects in that a haptic device may unintentionally produce sound that is heard by the user and a speaker can produce vibrations that are felt by the user. Generally, these side effects are suboptimal and uncontrolled, which can result in a degraded user experience.

SUMMARY

Embodiments described herein provide a feedback device for an electronic device that employs one or more actuators to produce an audio output. In one aspect, a feedback or electronic device can include a substantially flat feedback surface and one or more actuators operably connected to the feedback surface. As one example, each actuator can be operably connected to a respective side edge of the substantially flat feedback surface and produce vertical and horizontal movement in the feedback surface. In some embodiments, a connection member may be operably connected between the feedback surface and each actuator. Additionally or alternatively, a processing device can be operably connected to the one or more actuators. The processing device may transmit an actuator input signal to at least one actuator that causes the at least one actuator to produce a force in at least one direction that produces vertical and/or horizontal movement in the feedback surface. In some embodiments, the vertical movement in the feedback surface produces the audio output. The movement in the feedback surface may also provide a haptic output to a user.

In another aspect, an electronic device may include an actuator and a processing device operably connected to the actuator. The processing device can be adapted to transmit actuator input signals to the actuator that cause the actuator to move and produce an audio output when the actuator receives a first actuator input signal having a first frequency. Additionally or alternatively, the processing device may be adapted to transmit actuator input signals to the actuator that cause the actuator to move and produce a haptic output when the actuator receives a second actuator input signal that has a second frequency that is different from the first frequency.

As one example, the first frequency may be higher than a first frequency value and the second frequency may be less than a second frequency value.

In another aspect, a method of operating an actuator in an electronic device includes receiving by the actuator a first actuator input signal to create movement in the actuator that produces a ticking sound. The actuator may also receive a second actuator input signal having a second frequency that is different than the first frequency to create movement in the actuator that produces a haptic output.

In yet another aspect, a method of operating an actuator in an electronic device to produce an audio output can include receiving an output signal from one or more sensors operably connected to a processing device in the electronic device. The processing device may transmit to the actuator an actuator input signal associated with the output signal to produce movement in the actuator that produces the audio output.

In another aspect, a method of operating an actuator in an electronic device to produce an audio output can include receiving from an application program an audio enable signal, and transmitting to the actuator an actuator input signal associated with an operation of the application program to produce movement in the actuator that produces the audio output.

In some embodiments, an output adjustment mechanism may adjust the audio output by modifying, generating, or selecting at least one actuator input signal that is received by one or more actuators to adjust the audio output. The actuator input signal or signals may adjust the attracting and/or repelling force produced by the actuator(s). The adjusted force produces a different motion in the feedback surface, which may change the audio output of the electronic device. In some embodiments, the actuator input signal or signals also produce a haptic output.

BRIEF DESCRIPTION OF THE DRAWINGS

Embodiments of the invention are better understood with reference to the following drawings. The elements of the drawings are not necessarily to scale relative to each other. Identical reference numerals have been used, where possible, to designate identical features that are common to the figures.

DETAILED DESCRIPTION

Figure 1:
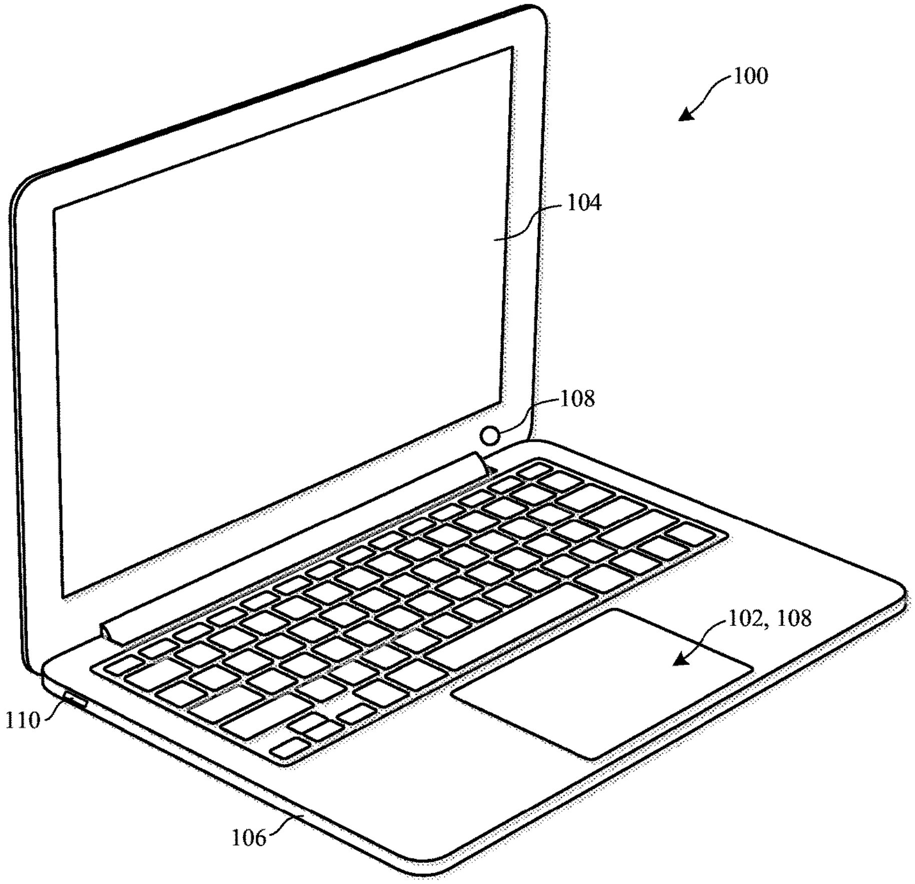
FIG. 1 is a perspective view of one example of an electronic device suitable for including a feedback device.

A feedback device in an electronic device can include a feedback surface and one or more actuators operably connected to the feedback surface. In some embodiments, the feedback surface is substantially flat. At least one of the actuators produces an attracting and/or a repelling force that creates movement in the feedback surface based on an actuator input signal received by the actuator. Audio output is created at least in part by producing an out of plane or vertical movement in the feedback surface. In some embodiments, the feedback surface can also provide a haptic output to a user. The attracting and/or repelling force produced by at least one actuator creates the haptic output in the feedback surface by moving the feedback surface in a horizontal and/or vertical direction. In other embodiments, both an audio output and a haptic output are produced in the feedback surface. It should be appreciated that descriptions of various functions, operations, components, arrangements and so on, as described with respect to any particular embodiment, may be used, incorporated, or otherwise added into any other embodiment described herein. Accordingly, embodiments described herein are not meant to be limited only to the particular description but can be combined or incorporated with other embodiments.

A feedback device can be implemented with any suitable feedback surface in an electronic device. As one example, a substantially flat feedback surface can be an exterior surface of a display or of a cover glass overlying a display. Another example of a substantially flat feedback surface may include an exterior surface or input surface of a touchpad, or at least a portion of an exterior surface of an enclosure of the electronic device. In another example, a feedback surface can be an attachment or coupling mechanism for a wearable communication device. For example, the attachment mechanism can be mechanism that secures a strap, a band, or a lanyard to the wearable communication device.

In other embodiments, one or more actuators alone may produce an audio output based on an actuator input signal received by the actuator. As one example, an actuator can be configured to produce a haptic output when a lower frequency actuator input signal is received by the actuator. The same actuator may produce an audio signal when a higher frequency actuator input signal is received by the actuator. The actuator may generate both a haptic output and an audio output based on an actuator input signal having lower frequency components and higher frequency components.

In some embodiments, the actuator input signal can be the audio signal itself. In other embodiments, the actuator input signal can be a signal that is based on a processed audio signal. For example, an audio signal may be analyzed and an actuator input signal generated based on one or more characteristics in the audio signal, such as a peak amplitude and a frequency. The actuator input signal is then received by one or more actuators to produce an audio output.

As one example, a haptic actuator may be used to generate an audio signal such that the audio comes from (or sounds as if it comes from) inside a device enclosure rather than from a speaker communicating with an external environment. This may be useful when reproducing or generating sounds that ordinarily would originate from within a device, such as the ticking of a mechanical watch, the noise of a joint or detent changing positions, a gear moving, and so on. Thus, the actuator may be used to impart a degree of verisimilitude to an electronic device that mimics or duplicates a device with certain mechanical properties.

Figure 2:
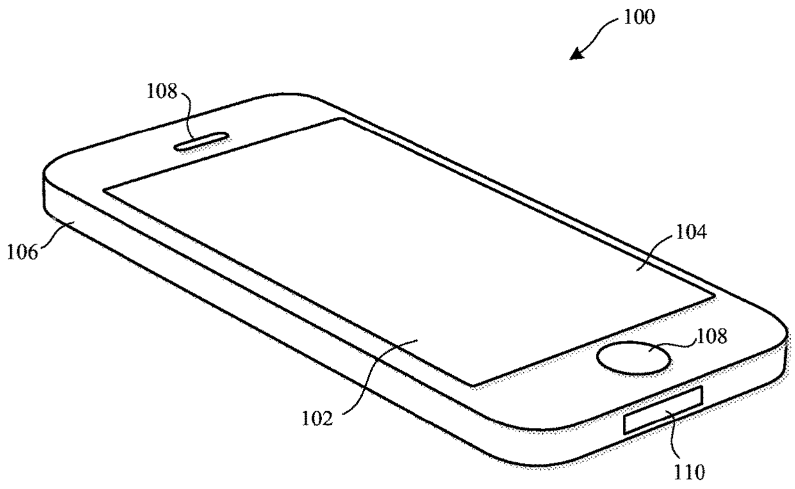
FIG. 2 is a perspective view of another example of an electronic device suitable for including a feedback device.

The methods and devices described herein may be used with substantially any type of apparatus or device that includes one or more actuators. FIGS. 1 and 2 are perspective views of exemplary electronic devices that can incorporate an actuator or actuators. As shown in FIG. 1, the electronic device 100 may be a laptop computer. Alternatively, as depicted in FIG. 2, the electronic device 100 can be a smart telephone or mobile electronic device. It should be noted that the electronic devices illustrated in FIGS. 1 and 2 are illustrative only and substantially any other type of electronic device may include one or more actuators. Examples of other electronic devices include, but are not limited to, a digital music player, a tablet computing device, a digital camera, a calculator, and a personal digital assistant.

With reference to FIGS. 1 and 2, the electronic device 100 may include a feedback device 102, a display 104, an input/output member 108, and an input/output port 110. The display 104 may provide an image or video output for the electronic device 100. The display 104 can be substantially any size and may be positioned substantially anywhere on the electronic device 100. In some embodiments, the display 104 can be a liquid crystal display screen, a plasma screen, or a light emitting diode screen. The display 104 may also function as an input device in addition to displaying output from the electronic device 100. For example, the display 104 can include capacitive touch sensors, infrared touch sensors, or the like that may capture a user's input to the display 104. In these embodiments, a user may press on the display 104 in order to provide input to the electronic device 100. In other embodiments, the display 104 may be separate from or otherwise external to the electronic device but in communication therewith to provide a visual output for the electronic device.

The input/output member 108 allows a user to interact with the electronic device 100. The input/output member 108 can be a switch, a capacitive sensor, a button, speakers, a microphone, a camera, or another input/output mechanism. For example, the input/output member 108 may be a button or switch to power on (or off) the electronic device 100, to alter the volume of a speaker, to return to a home screen, and the like. The electronic device 100 can include one or more input/output members 108, and each input/output member 108 may have one or more input/output functions. Furthermore, as briefly mentioned above, in some embodiments, the input/output member 108 can be incorporated into the display 104 (e.g., a capacitive touch screen as the display 104).

The enclosure 106 may form a portion of an exterior of the electronic device 100 and may at least partially surround all or select components, such as the display 104, the feedback device 102, the input/output member 108, the input/output port 110, a processing device, memory, and so on, of the electronic device 100. The enclosure 106 may be removable from the device 100, or may be substantially secured around the select components.

The input/output port 110 may be formed within or defined by the enclosure 106 and may electrically connect an external device to one or more internal components of the electronic device 100. Example external devices include, but are not limited to, headphones, speakers, communication networks such as the Internet, and removable memory storage. The input/output port 110 can be configured to receive an electrical connector for the electronic device 100.

For example, the input/output port 110 may be configured to receive a power cord, a data cable (e.g., universal serial bus, fiber optic, tip ring sleeve connector), or a combination data and power cable. The electronic device 100 can include more than one input/output port 110 and each input/output port 110 may be positioned substantially anywhere on the electronic device 100.

In some embodiments, the feedback device 102 functions as an audio device. The feedback device 102 may also act as a haptic device that provides haptic output to a user. In the illustrated embodiments of FIGS. 1 and 2, the feedback device 102 is included in a track pad 108 and in a display 104, respectively. In other embodiments, the feedback device can be included in other components of an electronic device. As one example, a feedback device can be included in at least a portion of an enclosure. As another example, a feedback device may be incorporated in a mouse or a keyboard, or in multiple components in, or connected to an electronic device (e.g., a display and a track pad).

Figure 3:
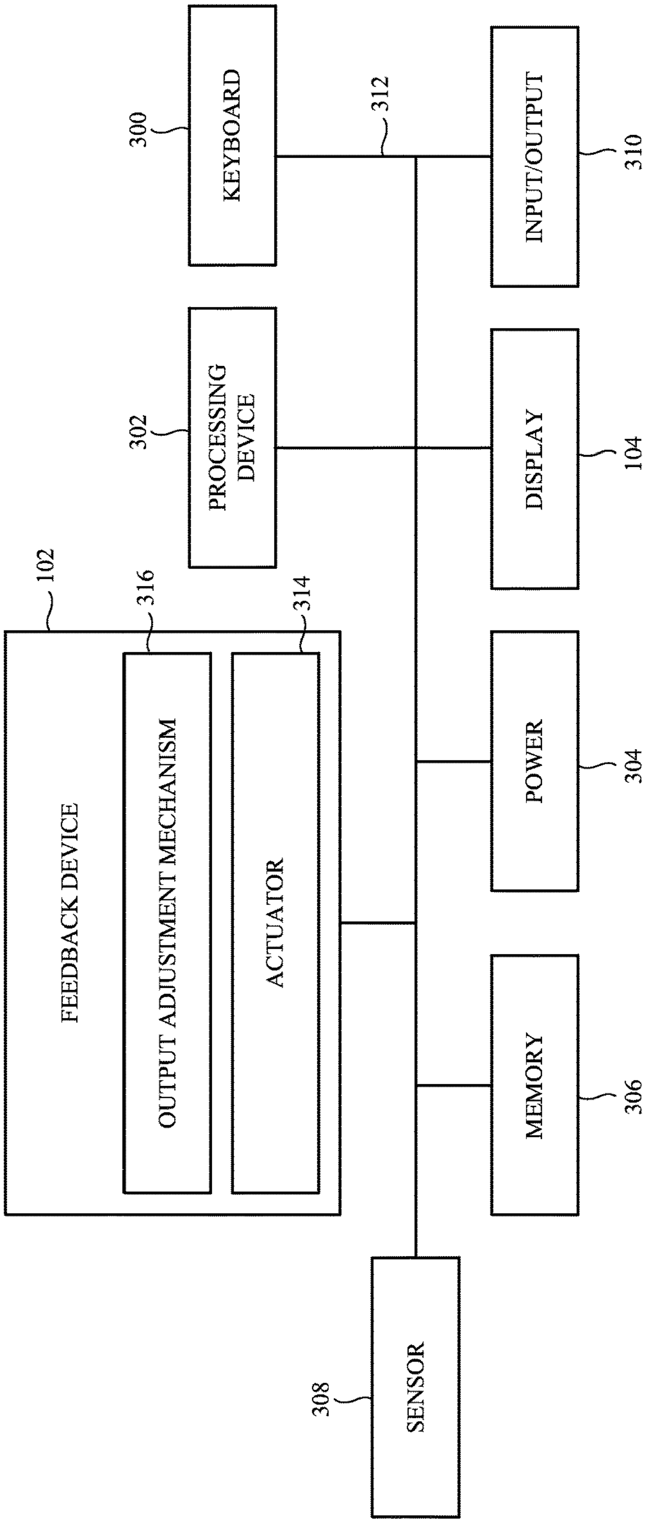
FIG. 3 is an example block diagram of the electronic device of FIG. 1.

FIG. 3 is an example block diagram of the electronic device of FIG. 1. The electronic device 100 can include the feedback device 102, the display 104, a keyboard 300, a processing device 302, a power source 304, a memory or storage device 306, a sensor 308, and an input/output 310 (e.g., input/output device and/or an input/output port). The processing device 302 can control some or all of the operations of the electronic device 100. The processing device 302 can communicate, either directly or indirectly, with substantially all of the components of the electronic device 100. For example, a system bus or signal line 312 or other communication mechanism can provide communication between the feedback device 102, the processing device 302, the power source 304, the memory 306, the sensor 308, and/or the input/output 310.

The processing device 302 can be implemented as any electronic device capable of processing, receiving, or transmitting data or instructions. For example, the processing device 302 can be a microprocessor, a central processing unit (CPU), an application-specific integrated circuit (ASIC), a digital signal processor (DSP), or combinations of such devices. As described herein, the term "processing device" is meant to encompass a single processor or processing unit, multiple processors, multiple processing units, or other suitably configured computing element or elements.

It should be noted that the components of the electronic device can be controlled by multiple processing devices. For example, select components of the electronic device 100 may be controlled by a first processing device and other components of the electronic device 100 may be controlled by a second processing device where the first and second processing devices may or may not be in communication with each other.

The power source 304 can be implemented with any device capable of providing energy to the electronic device 100. For example, the power source 304 may be one or more batteries or rechargeable batteries. Additionally or alternatively, the power source can be a power cord that connects the electronic device to another power source such as a wall outlet, or a connector cable that connects the electronic device to another device, such as a USB cable.

The memory 306 can store electronic data that can be used by the electronic device 100. For example, a memory can store electrical data or content such as, for example, audio and video files, actuator input signals, documents and applications, device settings and user preferences, timing signals, control signals, and data structures or databases. The memory 306 can be configured as any type of memory. By way of example only, the memory can be implemented as random access memory, read-only memory, Flash memory, removable memory, or other types of storage elements, or combinations of such devices.

The electronic device 100 may also include one or more sensors 308 positioned substantially anywhere on the electronic device 100. The sensor(s) 308 can be configured to sense substantially any type of characteristic, such as but not limited to, pressure, light, touch, heat, movement, relative motion, biometric data, and so on. For example, the sensor(s) 308 may be a heat sensor, a force sensor, a position sensor, a light or optical sensor, an accelerometer, a pressure transducer, a gyroscope, a magnetometer, a health monitoring sensor, a biometric sensor, and so on. Additionally, the one or more sensors 308 can utilize any suitable sensing technology, including, but not limited to, capacitive, ultrasonic, resistive, optical, ultrasound, piezoelectric, and thermal sensing technology.

The input/output 310 can transmit and/or receive data from a user or another electronic device. The I/O device(s) can include a display, a touch sensing input surface such as a trackpad, one or more buttons, one or more cameras, one or more microphones or speakers, one or more ports such as a microphone port, and/or a keyboard. Additionally or alternatively, an I/O device or port can transmit electronic signals via a communications network, such as a wireless and/or wired network connection. Examples of wireless and wired network connections include, but are not limited to, cellular, Wi-Fi, Bluetooth, IR, and Ethernet.

In some embodiments, the processing device 302 may communicate with the feedback device 102 to control one or more actuators 314 and/or an output adjustment mechanism 316 of the feedback device 102. As will be described in more detail later, the output adjustment mechanism can adjust the attracting and/or repelling force produced by the at least one actuator to produce an adjusted movement in a feedback surface of the feedback device. In some embodiments, the memory 306 may store operation (e.g., actuator input signals) and/or user settings for the feedback device 102.

It should be noted that FIG. 1-3 are exemplary only. In other examples, the electronic device may include fewer or more components than those shown in FIGS. 1-3. Additionally, the illustrated electronic devices are only exemplary devices that can include a feedback device 102. As described earlier, a feedback device may be incorporated into substantially any type of device that provides audio output, and optionally haptic output, to a user. Additionally or alternatively, a feedback device can be included in any type of component within, or connected to an electronic device.

Figure 4:
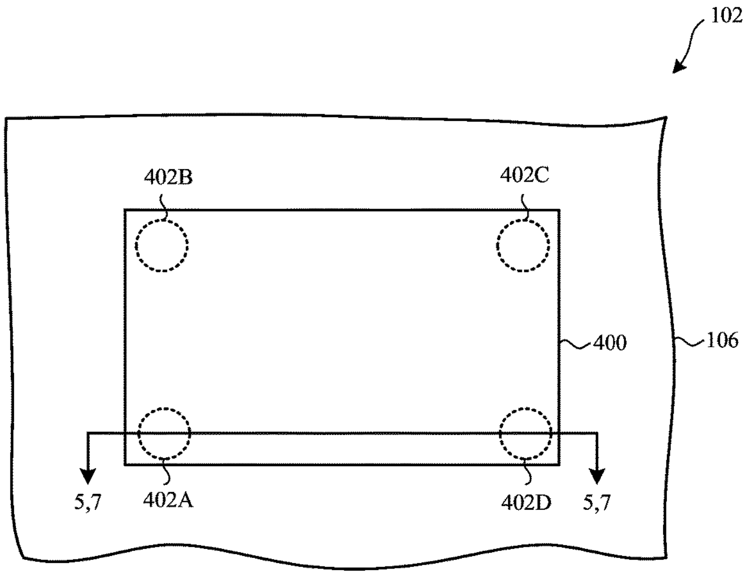
FIG. 4 is an enlarged top plan view of the feedback device of FIG. 1.
Figure 5:
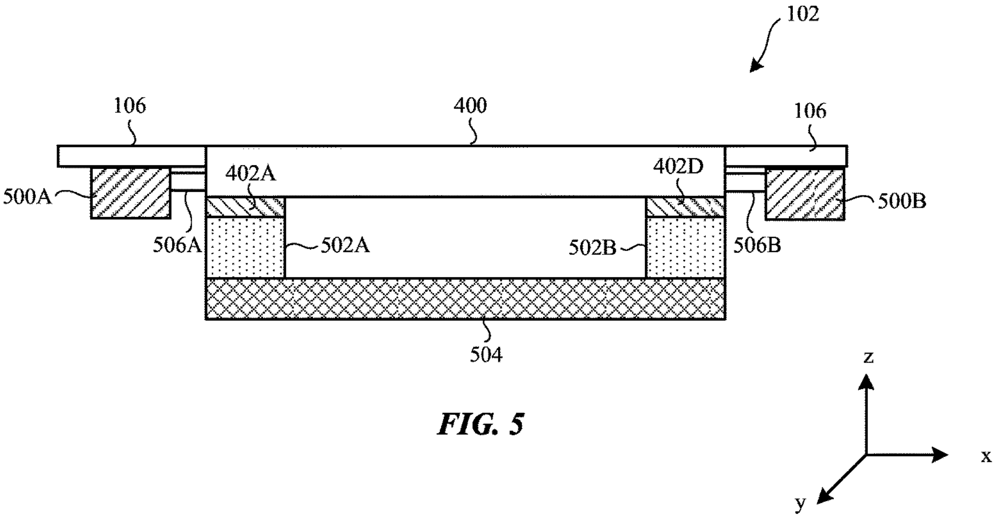
FIG. 5 is a cross-sectional view of a first example of the feedback device 102 taken along line 5-5 in FIG. 4.

Referring now to FIGS. 4 and 5, there is shown an enlarged plan view and a cross-sectional view of a first example of the feedback device 102, respectively. The feedback device 102 selectively provides audio output to a user by moving, vibrating, or otherwise alternating a feedback surface 400. In the illustrated embodiment, the feedback surface 400 is substantially co-planar with an exterior surface of the enclosure 106 of the electronic device. But other embodiments can position the feedback surface 400 differently. For example, a feedback surface can be recessed with respect to an exterior surface of an enclosure. Additionally, the feedback surface is shown in a rectangular shape. In other embodiments, the feedback surface 400 may have any suitable shape and dimensions.

In some embodiments, the feedback device 102 can include one more force sensors 402A, 402B, 402C, 402D. In other embodiments, the feedback device can include other types of sensors, such as a position sensor (not shown) that may be disposed below the feedback surface 400 and an acceleration sensor (not shown) configured to detect an acceleration of a user input. The force sensor(s) can be any suitable type of sensor capable of detecting an exerted force. For example, in some embodiments each force sensor may be a strain gauge.

As shown in FIG. 5, the feedback device 102 may also include one or more biasing supports 502A, 502B to secure and support the feedback device 102 to the electronic device 100 and/or to support the feedback surface 400 above a substrate 504. In some embodiments, a feedback device may include four biasing supports that each may be operably connected to the feedback surface 400 below or at a location substantially adjacent to the location of the force sensors 402A, 402B, 402C, 402D. The biasing supports 502A, 502B may provide a biasing force to the feedback surface 400 to return the feedback surface 400 to a normal or first position. The biasing supports may be substantially any member capable of providing a biasing or return force to the feedback surface 400. In some embodiments, the biasing supports may be a relatively flexible and resilient member, such as a gel. In this example, the gel may be a silicon based gel that may be positioned around the sides of the feedback surface 400. In other embodiments, the biasing supports can be one or more springs spanning between the substrate 504 and the feedback surface 400. And in yet other embodiments, the feedback device 102 may use a magnetic force from one or more magnets to return the feedback surface 400 to the first position.

The feedback device 102 may include one or more actuators 500A, 500B operably connected to the feedback surface 400 by one or more connection members 506A, 506B, respectively. In the illustrated embodiment, the one or more actuators 500A, 500B are operably connected to the side edges of the feedback surface 400. At least one actuator 500A, 500B can receive one or more actuator input signals from a processing device (e.g., processing device 302 in FIG. 3) or other controlling element, and those signals may be converted into mechanical movement by the actuator. In one embodiment, an actuator input signal is an audio signal for the audio to be played by the feedback device. In another embodiment, an actuator input signal is a signal (e.g., an audio signal) that has been processed before being received by one or more actuators.

Any suitable type of actuator can be included in the feedback device 102. For example, an actuator may be a solenoid actuator including a wire wound around a moveable iron core, and as a current passes through the wire coil, the iron core may move correspondingly. Specifically, the electric current through the wire may create a magnetic field. The magnetic field may then apply a force to the core or plunger, to either attract or repel the core. In these embodiments, the actuator may also include a spring or biasing member which may return the core to its original position after the magnetic field is removed. In other embodiments, an actuator may be an electromagnet, or a series of magnets that are selectively energized to attract or repel the feedback surface 400. As a specific example, the actuator may be a series of bar electromagnets with alternating poles that may be used to mechanically move the feedback surface 400. One exemplary actuator is described in more detail in conjunction with FIG. 9.

Each actuator may selectively move the feedback surface 400 in a horizontal or linear direction, e.g., along the X axis and/or the Y axis illustrated in FIG. 5. In other words, the feedback surface 400 may translate horizontally but may not move vertically with respect to the enclosure 106. In other embodiments, the actuator or actuators may move the feedback surface 400 in a vertical direction (along a Z axis) or in a combination of vertical and horizontal directions. With respect to the feedback device 102, sound (e.g., an audio output) can be produced by creating movement or vibrations in at least a vertical direction (z direction) of the feedback surface. The movement in the vertical direction (z direction) moves the air and produces sound. Additionally or alternatively, haptic output can be provided to a user through movement in the feedback surface 400.

Figure 6:
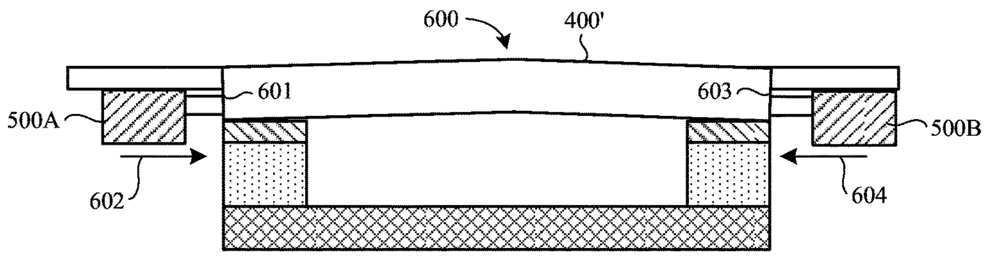
FIG. 6 is a cross-sectional view of feedback device 102 of FIG. 5 with movement in the vertical direction.

Referring now to FIG. 6, there is shown a cross-sectional view of the feedback device 102 of FIG. 5 with movement in the vertical direction. The movement in the vertical direction in the feedback surface 400 (see area 600) is created when one or more actuators apply force to the feedback surface 400. In particular, in the illustrated embodiment the actuator 500A can apply a force in the direction indicated by the arrow 602 to one side edge 601 of the feedback surface while the actuator 500B applies a force in the direction indicated by the arrow 604 to another side edge 603 of the feedback surface. The opposing forces cause the feedback surface 400 to flex or bend. As one example, the feedback surface can bend at the area 600. Other embodiments can cause the feedback surface 400 to bend or flex at one or more locations, either substantially simultaneously or at different times. For example, the location of the actuator (e.g., adjacent sides of the feedback surface and/or below the feedback surface), the amount of force applied by an actuator, the time at which an actuator applies a force to the feedback surface, and/or the angle at which the force is applied to the feedback surface can produce different bend locations in the feedback surface 400.

Additionally, in some embodiments a haptic output can be produced by either one or both of the actuators 500A, 500B applying a force to the feedback surface 400. Similar to the audio output, the amount of force applied by an actuator, the time at which an actuator applies a force to the feedback surface, and/or the angle at which the force is applied to the feedback surface can produce different haptic outputs in the feedback surface 400.

Figure 7:
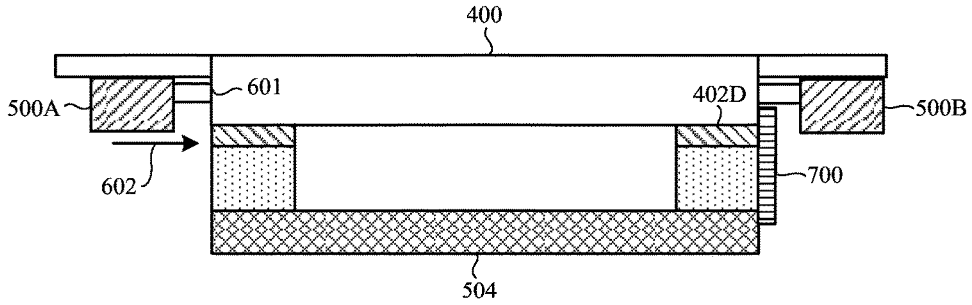
FIG. 7 is cross-sectional views of a second example of the feedback device 102 taken along line 7-7 in FIG. 4.

FIG. 7 is a cross-sectional view of a second example of the feedback device 102 taken along line 7-7 in FIG. 4. The illustrated embodiment is similar to the embodiment shown in FIG. 5, with the addition of a hinge or movable mechanism 700 operably attached to the feedback surface 400 and to the substrate 504. Other embodiments may use a different type of moveable mechanism and can position and/or attach the movable mechanism differently.

In the illustrated embodiment, a force applied to the feedback surface 400 by one or more actuators on one surface (e.g., side edge) of the feedback surface can produce a haptic output, while a force applied by two or more actuators on different surfaces (e.g., different side edges) of the feedback surface may create an audio output. For example, when the actuator 500A in FIG. 7 applies a force to the feedback surface 400 in the direction of arrow 602 to the side edge 601, a haptic output is produced in the feedback surface.

Figure 8:
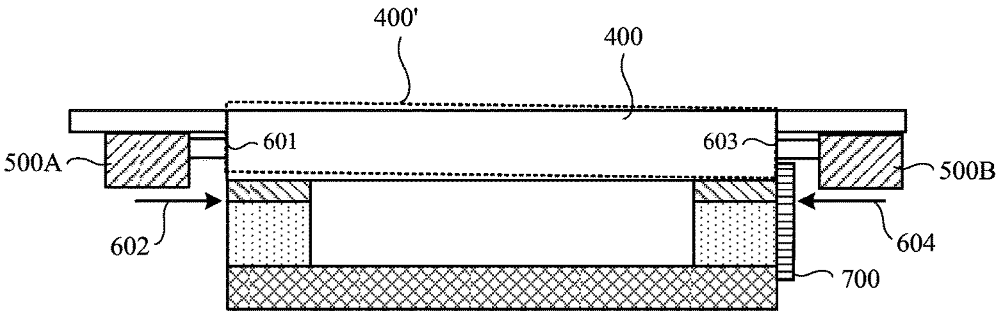
FIG. 8 is a cross-sectional view of the feedback device 102 of FIG. 7 with movement in the vertical direction.

When an audio output is to be produced, the actuators 500A and 500B can apply a force to the feedback surface. The actuator 500A may apply the force to the side edge 601 in the direction of arrow 602, while the actuator 500B applies the force to the side edge 603 in the direction of arrow 604. When the opposing forces are applied to the feedback surface, the feedback surface 400 may move or rotate vertically with respect to the movable mechanism 700 (see the feedback surface 400' in FIG. 8). For example, the magnitude of the force applied by actuator 500A may be less than the magnitude of the force applied by actuator 500B, which causes the feedback surface to rotate. Additionally or alternatively, only the actuator 500B may apply a force to the side edge 603 of the feedback surface to cause the feedback surface to rotate relative to the movable mechanism 700.

In some embodiments, such as in the embodiments of FIG. 6 and/or FIG. 7, an actuator and/or the connection member can be positioned with respect to the feedback surface so that the attracting and/or repelling force is applied to the feedback surface 400 at an angle. In these embodiments, the force produced by one or more actuators can create movement in the horizontal (x and/or y) and vertical (z) directions. And in other embodiments, including the embodiments of FIG. 6 and/or FIG. 7, an actuator and/or the connection member can be positioned with respect to the feedback surface so that the attracting and/or repelling force is applied to the feedback surface 400 vertically to create movement in the vertical direction.

Figure 9:
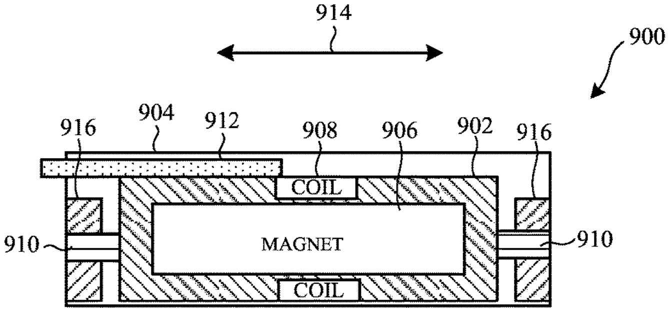
FIG. 9 depicts a cross-sectional view of one example actuator that is suitable for use in an electronic device.

Referring now to FIG. 9, there is shown a cross-sectional view of one example of an actuator that is suitable for use in an electronic device. The actuator 900 may include a frame 902 disposed within a case or housing 904. The frame 902 is configured to house and support a magnet array 906. In some embodiments, the magnet array 906 includes at least two magnets (not shown) of opposing polarities.

A coil 908 encircles the magnet array 906. The coil 908 may be energized by transmitting a current along the length of the wire forming the coil; the direction of the current flow determines the direction of the magnetic flux emanating from the coil in response to the current. As described in more detail later, passing a current through the coil may cause the magnet array 906 to move along a shaft 910. In order to prevent the magnet array 906 from being attracted to the shaft 910, which could increase friction between the two and thereby increase the force necessary to move the magnet array 906 and frame 902, the shaft 910 may be formed from a non-ferritic material such as tungsten, titanium, stainless steel, or the like.

An air gap separates the coil 908 from the magnet array 906. The frame 902 is free to move with respect to the coil 908, which is generally stationary. Further, the frame 902 generally moves with the magnet array 906. It should be appreciated that the coil 908 remains stationary in the case 904 while the frame 902 and one or more magnets 906 move, although in other embodiments the coil 908 may move instead of, or in addition to, the frame and/or magnet array. By keeping the coil stationary, it may be easier to provide interconnections for the coil, such as between the coil and the flexible circuit 912, and therefore reduce the manufacturing complexity.

Generally, when the coil 908 is energized, it creates a magnetic field. The opposing polarities of the magnets in the magnet array 906 generate a radial magnetic field that interacts with the magnetic field of the coil 908. The Lorentz force resulting from the interaction of the magnetic fields with the current through the coil moves the magnet array 906 and frame 902 along the shaft 910, insofar as the coil is fixed with respect to the case of the actuator. Reversing current flow through the coil 908 reverses the Lorentz force, and thus the force on the magnet array and frame. Thus, the array and frame may move in both directions along the shaft, as indicated by arrow 914, depending on the direction of current flow through the coil.

Accordingly, when the coil is energized, the magnet array 906 will slide along the shaft 910 in one direction or its opposite, depending on the polarity of the field. If the current through the coil 908 is sufficiently high, the magnet array 906 and associated frame 902 will move rapidly and reach a high velocity. If the coil is de-energized before the central magnet array moves too far (for example, before the central magnet array no longer underlies the coil), then the Lorentz force exerted on the central magnet array is reduced to zero and the frame/magnet array may continue to move.

In some embodiments, after a target velocity or displacement is reached the coil may be energized in a direction opposite its initial energization. This may cause the generated magnetic field to exert a force in a direction opposite the initial motion of the central magnet array and/or frame, thereby slowing down or braking the frame and array structure. This may be useful to control or limit oscillation, especially at or near a resonance frequency of the actuator 900, or to maintain such a resonance frequency. Accordingly, the coil 908 can not only “pull” but can also “push” the magnet array, thereby imparting a motive force in two opposing directions through selective application of the coil’s magnetic field. This may permit fine control over motion and/or velocity of the frame 902 and the magnet array 906, both in multiple directions and when compared to other linear actuators.

A compliant member 916 may be positioned on each side of the frame 902. The compliant members 916 can assist in returning the frame 902 to a central or nominal position. Additionally or alternatively, the compliant members 914 may dampen the force applied to the sides of the case 904 by the movement of the frame 902 and magnet array 906. Any suitable type of compliant member 916 can be used. For example, in one embodiment, each compliant member is a spring that encircles the shaft 910.

Figure 10:
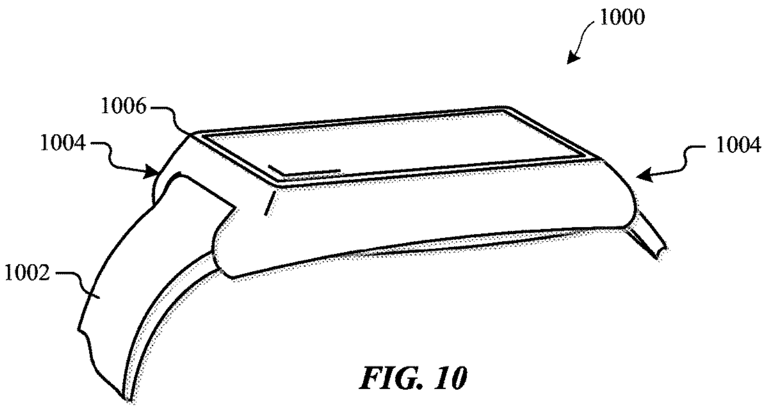
FIG. 10 illustrates an example electronic device that can include the actuator 900 shown in FIG. 9.

Referring now to FIG. 10, there is shown a perspective view of an electronic device that can include the actuator 900 shown in FIG. 9. Other embodiments are not limited to the use of actuator 900. A different type of actuator that is suitable to produce an audio output may be employed in some embodiments. In the illustrated embodiment, the electronic device 1000 is shown as a wearable communication device. The wearable communication device may be configured to provide, for example, wireless electronic communication from other devices, and/or health-related information or data such as but not limited heart rate data, blood pressure data, temperature data, oxygen level data, diet/nutrition information, medical reminders, health-related tips or information, or other health-related data. Further, an electronic device, including the wearable electronic device shown in FIG. 10, can include multiple actuators. The actuators can all be the same type of actuator or the actuators can be different types of actuators.

The wearable communication device 1000 may include a coupling mechanism to connect a strap or band 1002 useful for securing to a user. For example, a wearable communication device may include a band or strap to secure the device to a user’s wrist. In another example, a wearable communication device may include a strap to connect around a user’s chest, or alternately, a wearable communication device may be adapted for use with a lanyard or necklace. In still further examples, a wearable communication device may secure to or within another part of a user’s body. In these and other embodiments, the strap, band, lanyard, or other securing mechanism may include one or more electronic components or sensors in wireless or wired communication with an optional accessory. The accessory device may be, for example, a tablet computing device, smart telephone, a computer, and so on. As one example, the band secured to a wearable communication device may include one or more sensors, an auxiliary battery, a camera, or any other suitable electronic component.

An attachment mechanism 1004 may operably connect each end of the band 1002 to an enclosure 1006 of the wearable communication device. In one embodiment, an actuator may be provided in one or both attachment mechanisms 1004. In another embodiment, an actuator can be included in the enclosure 1006. At least one exterior surface of the attachment mechanism or enclosure can operate as a feedback surface. The feedback surface may be curved slightly with a portion of the feedback surface being substantially flat. For example, at least a portion of the feedback surface that is in contact with a part of the user's body (e.g., wrist) may be substantially flat. Thus, a feedback device may be the actuator by itself, or the actuator and a substantially flat feedback surface.

An actuator may produce an audio output based on an actuator input signal received by the actuator that causes movement in the actuator. In one embodiment, the actuator input signal is the audio signal itself, and the audio signal is played through the actuator. In another embodiment, the actuator input signal can be a signal that is based on a processed signal. For example, an audio signal may be analyzed and an actuator input signal generated based on one or more characteristics in the audio signal, such as a peak amplitude and a frequency. The actuator input signal that is based on the processed audio signal is then played through the actuator to produce an audio output.

In some embodiments, an actuator can be configured to produce a haptic output when a lower frequency actuator input signal is received by the actuator. As one example, the actuator input signal can have a frequency that is less than or equal to a first particular frequency value. In this embodiment, the actuator input signal will create movement in the actuator, which in turn produces movement in the feedback surface. The same actuator may produce an audio signal when a higher frequency actuator input signal is received by the actuator. For example, the actuator input signal can have a frequency that is equal to or greater than a second particular frequency value. The higher frequency actuator input signal will create movement in the actuator, but the actuator movement may or may not produce movement in the feedback surface. The first and second frequency values can be substantially the same frequency values or different frequency values.

In some embodiments, the actuator may generate a haptic output and an audio output based on an actuator input signal having both lower frequency components and higher frequency components. The haptic and audio outputs can occur together or at different times. A haptic output can partially or completely overlap with an audio output. In one embodiment, the actuator input signal will create movement in the actuator, which in turn produces movement in the feedback surface.

In other embodiments, an actuator can be configured to produce a haptic output when an actuator input signal having a frequency other than a lower frequency is received by the actuator. Additionally or alternatively, an actuator may produce an audio signal when an actuator input signal having a frequency other than a higher frequency is received by the actuator. The type and characteristics of the actuator and the characteristics of the actuator input signal may influence the audio output that is produced by a given actuator input signal.

In one example embodiment, an actuator in the wearable communication device 1000 can produce a ticking sound to emulate a mechanical wrist watch, such as a gear-driven watch. In some embodiments, the housing of the wearable communication device can dampen the audio produced by the actuator, which can cause the volume of the ticking sound to be low or soft so that a user hears the ticking sound only when the wearable communication device is near the user's face or next to the user's ear. In this manner, the audio output is not heard by the user continuously, and the audio output does not distract the user or become an annoyance to the user.

The audio signal may or may not be processed before the actuator receives the actuator input signal. The audio signal may have a frequency that causes the actuator to produce the ticking sound without generating a haptic output that is discernible by the user. Thus, the actuator may provide an audio cue to the user without producing a detectable physical cue.

To the user, the ticking sound can appear to be coming from within the wearable communication device itself. In contrast, when the audio signal is output by a speaker in the wearable communication device, the user may be able to ascertain that the ticking sound is coming from the speaker. Thus, the electronic device can imitate the sound of a convention mechanical watch by generating a ticking sound with an actuator included in the electronic device. The ticking sound may vary in duration, pitch, timbre, and/or volume based on the actuator input signal used to create the ticking sound.

Other embodiments are not limited to the generation of a ticking sound. Many other sounds may be generated with an actuator. Additionally, the sounds can appear to come from the interior of an electronic device rather than from a speaker or an exterior surface of the electronic device. Additionally or alternatively, an actuator can produce an audio output in conjunction with an audio output from a speaker. For example, one channel can be played through the speaker and another channel through the actuator. The combination of audio outputs from the actuator and the speaker can enhance the audio sound experienced by the user. A user may hear and feel the audio output. Additionally or alternatively, a user can receive an alert sound from the actuator and an audio output from the speaker (or vice versa) at the same time, sequentially, or with some overlap in time. For example when an actuator is operating to produce audio and a communication (text message, email, phone call, and so on) is received, the audio produced by the actuator may be adjusted or eliminated in order to focus the user's attention on a haptic alert or an audio alert played by a speaker that corresponds to the message or other condition generating the alert.

Other embodiments can use a different type of actuator to produce an audio output. For example, an electromagnetic actuator different from the linear actuator shown in FIG. 9 may be used to produce audio output. However, some actuators may not provide a sufficient level of control when generating an audio output. A rotational vibration motor actuator, for example, may not offer an appropriate amount of control that is needed to generate a desired audio output. Many vibration motors require a certain amount of time to spin up and are unable to decouple audio from a haptic output, or cannot generate audio without also generating a haptic output. Further, rotational vibration actuators (such as off-center actuators) may not have an operating range that permits the mimicking or generation of a variety of audio outputs, regardless of whether or not a haptic output is produced.

In some embodiments, the audio output may be produced by the actuator in response to a sensor output. As one non-limiting example, a motion sensor (e.g., an accelerometer, gyroscopic sensor, magnetometer, and so on) may sense that the electronic device is being raised and initiate audio from the actuator as a result. This may be facilitate playing the audio from or by the actuator when the device is raised to or near a user's ear or head, thereby playing the audio only when the user is engaged with the device and the device is sufficiently close to the user's ear. Likewise, audio may be terminated when a gesture, such as lowering the device, is detected by one or more sensors. Other sensor outputs may be used to initiate or terminate audio generation by the actuator as well. As another non-limiting example, an ambient light sensor may detect a drop in ambient light and a processing unit may interpret this as the device being at or near a user's head, particularly if the motion sensor has detected an appropriate gesture. Thus, multiple sensor outputs may be used in combination to control audio playback by the actuator as well.

Figure 11:
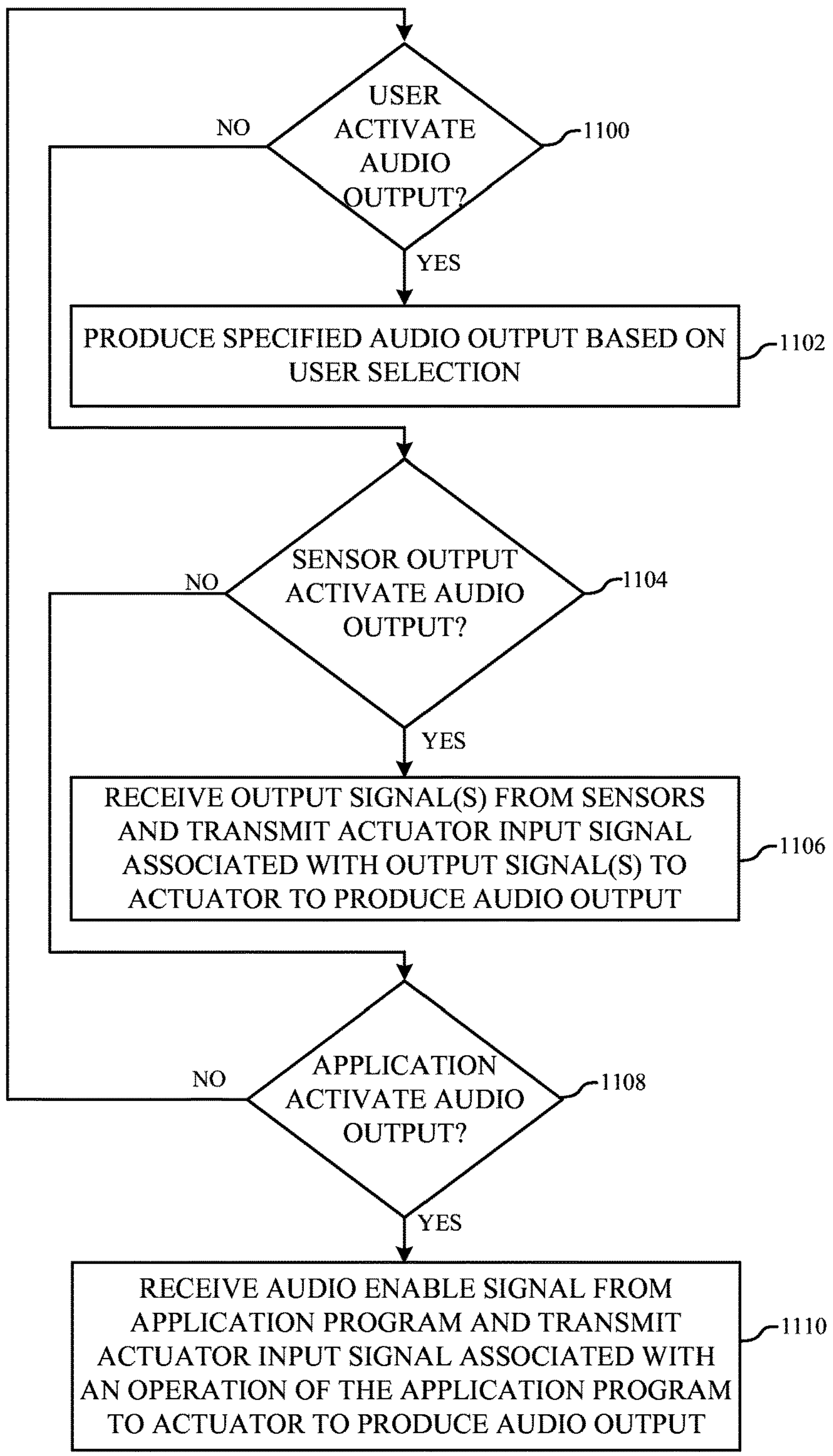
FIG. 11 is a flowchart of an example method of operating the wearable communication device 1000 shown in FIG. 10.

FIG. 11 is a flowchart of an example method of operating and/or controlling the wearable communication device 1000 shown in FIG. 10, although it should be understood that alternative operations, sequences of operations, and activities may be used to operate or control the device. Initially, a determination can be made as to whether or not a user has activated a specified audio output to be produced by an actuator (block 1100). If so, the process continues at block 1102 where the actuator generates the specified audio output. In one embodiment, a user can select a desired audio output through a menu, such as a pull-down menu. Additionally or alternatively, a user can select an icon on the display to select a particular audio output.

If a determination is made at block 1100 that the user did not activate an audio output, the method passes to block 1104 where a determination can be made as to whether or not an output signal from one or more sensors activates an audio output. As described earlier, a sensor can be configured to sense substantially any type of characteristic, such as light, heat, movement, and relative motion. An output signal from a sensor, or a combination of output signals from two or more sensors, may be associated with a particular audio output. When the given output signal(s) are received, the associated audio output can be activated.

If a determination is made at block 1104 that an output signal from one or more sensors did activate an audio output, the method passes to block 1106 where an output signal from one or more sensors is received and based on the output signals, an actuator input signal is transmitted to the actuator to cause the actuator to move and produce the audio output. In one embodiment, a processing device can receive the output signal(s) and transmit an associated actuator input signal to the actuator. For example, an ambient light sensor can receive less light, and based on the reduced light an image sensor can capture images that indicate a user has moved the electronic device near his or her face. Based on the data from these two sensors, an actuator can receive an actuator input signal that causes the actuator to produce an audio output, such as the ticking sound. As another example, a capacitive sensor can detect a user is touching a particular region on the enclosure of the communication device, which can result in the actuator producing a given audio output.

In some embodiments, an output signal from a sensor, or a combination of output signals from two or more sensors may be associated with one or more user gestures. As one example, a user can tap a portion of the band and the taps may be detected by a pressure sensor. An output signal from the pressure sensor may be received by a processing device, which in turn causes one or more actuators to produce an audio output that is associated with the taps. As another example, a user can rotate the communication device in a particular direction or move the communication device in a sequence of motions. An accelerometer and/or a gyroscope may generate an output signal that represents the motion(s). The output signal(s) can be received by a processing device, and the processing device may transmit a particular actuator input signal to one or more actuators to produce an audio output associated with the user motion(s). In some embodiments, a user may associate different actions and gestures with specific audio outputs using menus that include dialog boxes, pull-down menus, and/or radio buttons.

If a determination is made at block 1104 that an output signal from one or more sensors did not activate an audio output, the method continues at block 1108 where a determination may be made as to whether or not an application program activates an audio output. In one embodiment, an application program can produce an audio output using at least one actuator in the communication device. As one example, a clock application can produce the ticking sound described earlier to emulate a mechanical watch. Additionally, the audio output may be associated with particular operation or setting of an application program. For example, the ticking sound may be produced when an analog clock face is displayed by the clock application and not produced when a digital clock face is displayed by the clock application.

If an application program has not activated an audio output, the process returns to block 1100. If an application program has activated an audio output, the method continues at block 1110 where an audio enable signal may be received, and based on an operation the application program is performing, an actuator input signal is transmitted to an actuator. The actuator input signal causes the actuator to move and produce the audio output. In one embodiment, a processing device can receive the output signal(s) and transmit the actuator input signal to the actuator.

Although FIG. 11 has been described with reference to the wearable communication device shown in FIG. 10, other types of electronic devices that include one or more actuators can perform the method of FIG. 11. A smart telephone, a digital media player, a tablet computing device, and a laptop computer are example electronic devices that may perform the method shown in FIG. 11. Additionally, as described earlier, a combination of audio outputs can be produced by an electronic device, with some audio being played by the speaker and other audio being generated by the actuator.

Additionally, although the method shown in FIG. 11 has been described with reference to a single actuator, other embodiments can perform the method with multiple actuators. The actuator input signal received by each actuator may be the same signal, or at least one actuator input signal received by one actuator can differ from the actuator input signal received by another actuator.

Figure 12:
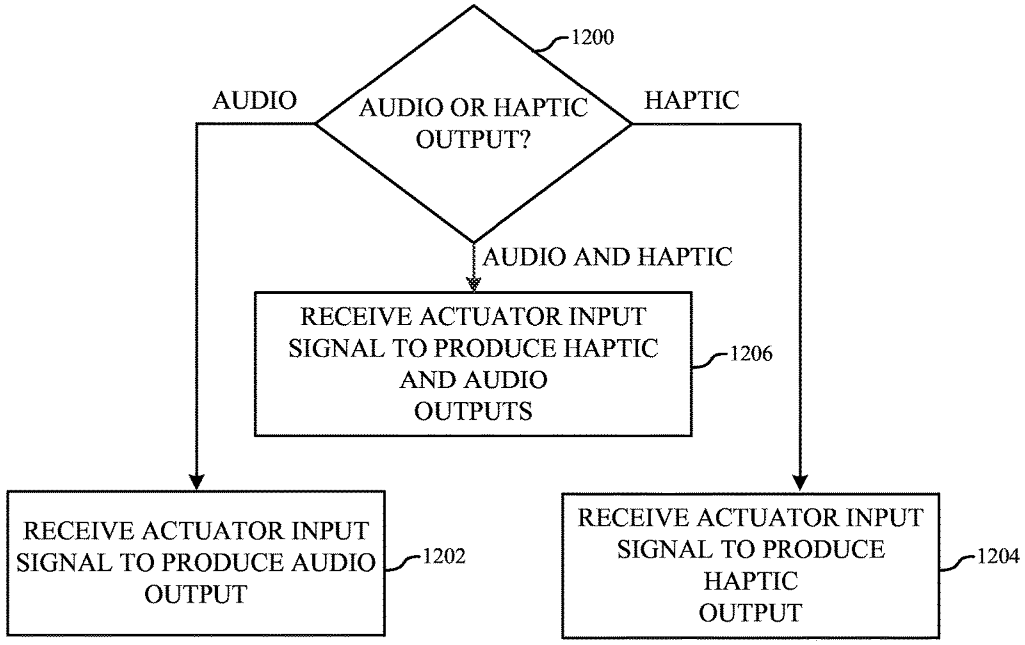
FIG. 12 is a flowchart of a method of operating a feedback device.

FIG. 12 is a flowchart of a method of operating a feedback device. Initially, a determination may be made as to whether audio output, haptic output, or both audio and haptic output is to be produced (block 1200). If an audio output is to be created, the process passes to block 1202 where one or more actuators in the feedback device receive an actuator input signal that causes the actuator(s) to produce the audio output. The actuator or actuators may move a feedback surface appropriately to produce the audio output, or the actuator(s) can generate the audio output.

Alternatively, if a haptic output is to be generated at block 1200, the method continues at block 1204 where one or more actuators in the feedback device each receive an actuator input signal that causes the actuator(s) to move the feedback surface appropriately to produce the haptic output. And if both an audio output and a haptic output are to be produced at block 1200, the process passes to block 1206 where one or more actuators in the feedback device receive an actuator input signal that causes the actuator(s) to produce the audio output and to move the feedback surface appropriately to produce the haptic output. The audio output can be generated by the movement in the feedback surface, or the audio output may be created by the movement in the actuator(s).

In the method of FIG. 12, the actuator input signal received by each actuator can be a signal having the same waveform, or at least one actuator input signal may have a waveform that is different from another actuator input signal waveform.

Embodiments described herein may adjust or change the levels of an audio output, and optionally a haptic output, of a feedback device. In some embodiments, the actuator or actuators can be configured to respond to one or more actuator input signals that may vary the mechanical output of at least one actuator in the feedback device. For example, if an actuator is a solenoid actuator, the various waveforms of the actuator input signals may vary the current through the wire, and thus may vary the magnetic field created. By changing the magnetic field, different types of mechanical movements may be created.

The actuator input signal can be, for example, a sinusoidal wave, a half sinusoidal wave, a half elliptical wave, a saw-tooth wave, a pulse, a ramp down or ramp up wave, a square wave, and various combinations of such waveforms. Additionally or alternatively, the actuator input signal can be generated by analyzing an audio signal. As the actuator receives the actuator input signal, the mechanical movement output by the actuator may vary, such that one type of waveform may have a different audio output, haptic output, or both audio and haptic outputs compared to another waveform. In other words, the displacement direction or directions of the actuator, the displacement direction or directions of the feedback surface, and/or the speed of the actuator or feedback surface may be varied by changing the shape, frequency, amplitude, phase, and/or duration of the actuator input signal. Thus, by changing the actuator input signal the audio output, and optionally the haptic output experienced by a user may be changed. One or more actuator input signals can be stored in a memory, such as the memory 306 in FIG. 3.

Figure 13:
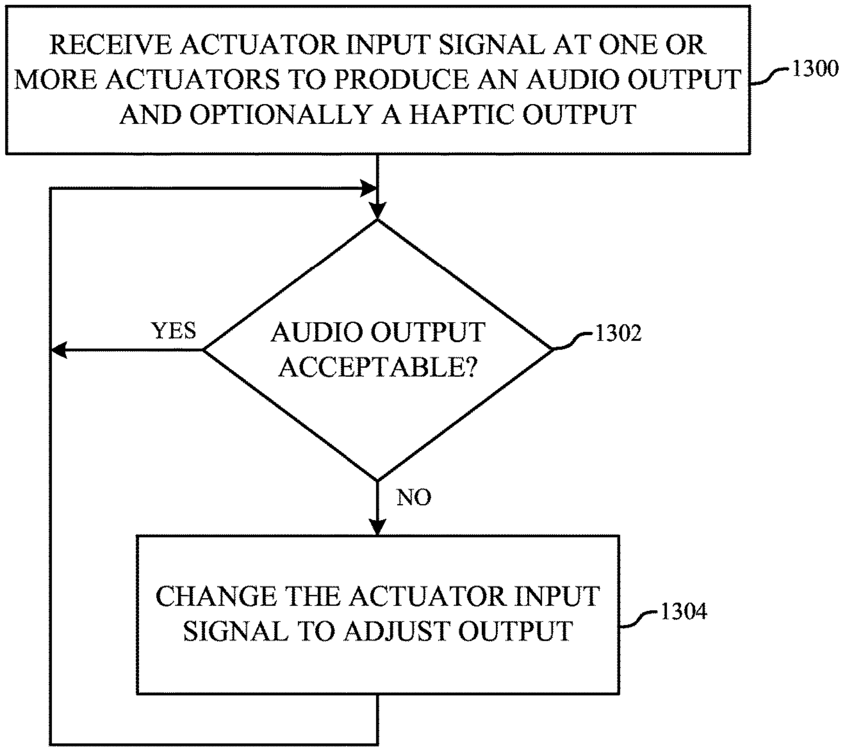
FIG. 13 is a flowchart of a method of adjusting an output of a feedback device.

Referring now to FIG. 13, there is shown a method for adjusting an output of a feedback device. Initially, a first actuator input signal is received by one or more actuators at block 1300. Next, as shown in block 1302, a determination is received as to whether or not the audio output is acceptable. If so, the method waits at block 1302. If the audio output is not acceptable, the process passes to block 1304 where the actuator input signal is adjusted (e.g., to a second actuator input signal) and the adjusted actuator input signal is received by the actuator(s). The method then returns to block 1302 and repeats until the audio output is acceptable.

The illustrative methods shown in FIGS. 12 and 13 may be performed by a manufacturer at the time the electronic device is fabricated. Additionally or alternatively, the method can be performed by a user when a user wishes to change the audio output of the feedback device. In some embodiments, a user can customize the audio output for select applications or functions.

Other embodiments can perform the methods shown in FIGS. 12 and 13 differently. For example, some embodiments may omit block 1206 in FIG. 12. Other embodiments can omit blocks 1204 and 1206 in FIG. 12.

Additionally, each method can be used for a single actuator or for multiple actuators in an electronic device. In embodiments that have multiple actuators, a different actuator input signal can be received by each actuator or by at least one of the actuators, or all of the actuators can receive the same actuator input signal.

Various embodiments have been described in detail with particular reference to certain features thereof, but it will be understood that variations and modifications can be effected within the spirit and scope of the disclosure. And even though specific embodiments have been described herein, it should be noted that the application is not limited to these embodiments. In particular, any features described with respect to one embodiment may also be used in other embodiments, where compatible. Likewise, the features of the different embodiments may be exchanged, where compatible.

What is claimed is:

1. An electronic device comprising:
- a substantially flat feedback surface;
- at least one actuator operably connected to a side edge of the substantially flat feedback surface; and
- a processing device operably connected to the at least one actuator, wherein the processing device transmits an actuator input signal to the at least one actuator that causes the at least one actuator to produce:
  - a first force that produces vertical movement in the substantially flat feedback surface to produce an audio output; and
  - a second force that produces horizontal movement in the substantially flat feedback surface to produce a haptic output.

2. The electronic device as in claim 1, wherein the processing device is operably connected to a memory.

3. The electronic device as in claim 2, wherein the memory stores a plurality of actuator input signals with each actuator input signal including at least one waveform characteristic that differs from at least one waveform characteristic of the other actuator input signals.

4. The electronic device as in claim 1, further comprising a connection member operably connected between the substantially flat feedback surface and the at least one actuator, wherein the first and second forces move the connection member and the substantially flat feedback surface.

5. The electronic device as in claim 3, further comprising an output adjustment mechanism for adjusting the audio output of the electronic device by selecting a different actuator input signal.

6. The electronic device as in claim 5, wherein the output adjustment mechanism adjusts the haptic output produced in the substantially flat feedback surface by selecting a different actuator input signal.

7. The electronic device as in claim 1, wherein:
- the at least one actuator comprises a first actuator;
- the electronic device further comprises a second actuator; and
- the first force produced by the first actuator opposes a force produced by the second actuator to cause the substantially flat feedback surface to bend.

8. The electronic device as in claim 1, further comprising a movable mechanism operably attached to the substantially flat feedback surface and to a substrate.

9. The electronic device as in claim 8, wherein at least one of the first or second forces causes the substantially flat feedback surface to rotate vertically with respect to the movable mechanism.

10. The electronic device as in claim 1, wherein the substantially flat feedback surface comprises an input surface of a trackpad.

11. The electronic device as in claim 7, wherein:

the side edge comprises a first side edge; and the second actuator is operably connected to a second side edge of the substantially flat feedback surface.

12. The electronic device as in claim 11, wherein the first side edge is opposite the second side edge.

13. The electronic device as in claim 7, wherein the first force is greater that the force produced by the second actuator.

14. The electronic device as in claim 1, wherein the horizontal movement is perpendicular to a plane defined by the side edge.

15. The electronic device as in claim 1, further comprising a gel, wherein:

the vertical movement moves the substantially flat feedback surface from a first position to a second position; and the gel returns the substantially flat feedback surface to the first position from the second position.

16. An electronic device comprising:

a feedback surface;

an electromagnetic actuator operatively connected to the feedback surface and comprising one or more magnets disposed around a shaft and a coil disposed around at least one of the one or more magnets; and a processing device operably connected to the electromagnetic actuator, wherein the processing device is adapted to transmit actuator input signals to the electromagnetic actuator that causes the one or more magnets to move along the shaft in at least one direction and produce an audio output and a haptic output when the coil receives a first actuator input signal having a first frequency component and a second frequency component; wherein:

the electromagnetic actuator causes vertical movement of the feedback surface to produce the audio output; and the electromagnetic actuator causes horizontal movement of the feedback surface to produce the haptic output.

17. The electronic device as in claim 16, wherein the electronic device comprises a wearable communication device.

18. A method of operating an actuator in an electronic device to produce a haptic output and an audio output, the method comprising:

receiving, by the actuator, a first actuator input signal having a first frequency;

outputting, based on the first actuator input signal, vertical movement in a feedback surface coupled to the actuator to produce a ticking sound;

receiving, by the actuator, a second actuator input signal having a second frequency that is different than the first frequency; and outputting, based on the second actuator input signal, horizontal movement in the feedback surface coupled to the actuator to produce a haptic output.

19. The method as in claim 18, wherein the first frequency is equal to or greater than a first value.

20. The method as in claim 19, wherein the second frequency is equal to or less than a second value, the second value being equal to or less than the first value.

* * * * *